No. 861,043. PATENTED JULY 23, 1907.
T. B. McMILLAN.
AUTOMATIC AIR BRAKE COUPLING.
APPLICATION FILED JAN. 19, 1907.

Inventor
Thomas B. McMillan

Witnesses
Frank B. Hofman
C. C. Hines

By Victor J. Evans
Attorney

UNITED STATES PATENT OFFICE.

THOMAS B. McMILLAN, OF SHERRY, TEXAS.

AUTOMATIC AIR-BRAKE COUPLING.

No. 861,043.  Specification of Letters Patent.  Patented July 23, 1907.

Application filed January 19, 1907. Serial No. 353,136.

*To all whom it may concern:*

Be it known that I, THOMAS B. MCMILLAN, a citizen of the United States of America, residing at Sherry, in the county of Red River and State of Texas, have invented new and useful Improvements in Automatic Air-Brake Couplings, of which the following is a specification.

This invention relates to an automatic air brake coupling, the object of the invention being to provide a coupling of this character whereby a quick coupling action between the coupling members on opposing cars may be effected in an automatic manner without the necessity of a trainman going between cars to unite the couplings.

Another object is to provide a coupling in which the coupling members on the cars will adjust themselves to variations in the heights of cars, to different positions to conform to curves in the tracks, and are supported so as to be effectually cushioned during the coupling action.

A still further object is to provide a coupling which is adaptable for use on freight or passenger cars, which is simple of construction, comparatively inexpensive of production and adapted to give the engineer of the train complete control of the brakes as soon as the cars are coupled together, without the necessity of any coupling of hoses after the car couplers proper are joined.

Figure 1:
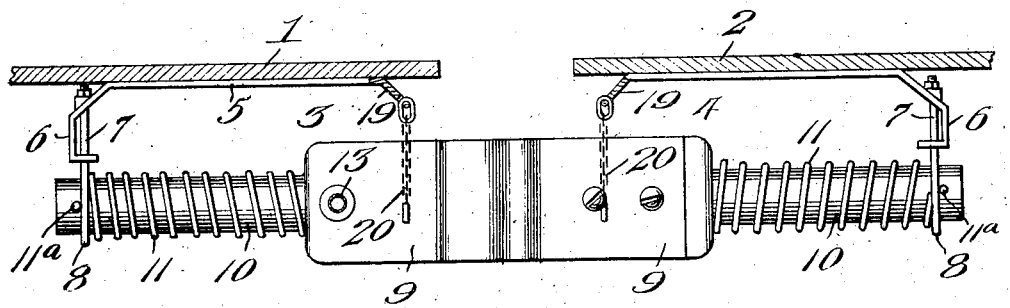
Figure 2:
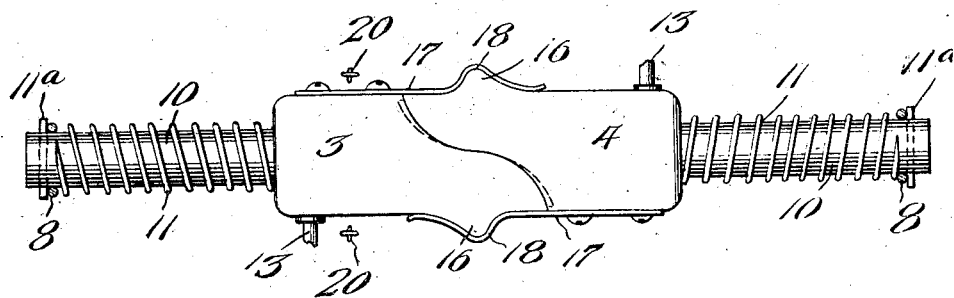
Figure 3:
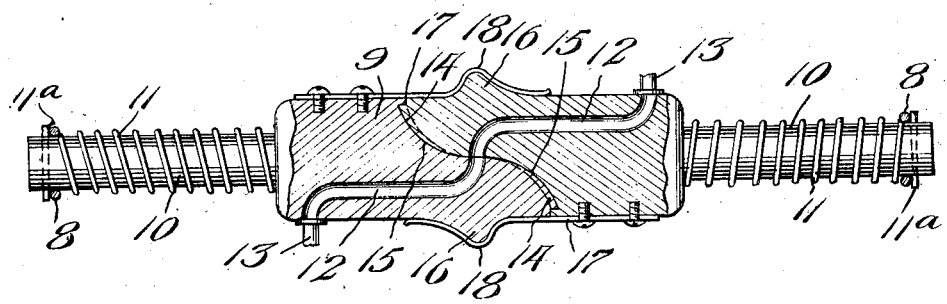

In the accompanying drawing,—Figure 1 is a side elevation of connected couplers of two opposing cars embodying my invention, portions of the cars being shown in longitudinal section. Fig. 2 is a top plan view of the same. Fig. 3 is a sectional elevation, the heads appearing in longitudinal section.

Referring to the drawings, 1 and 2 represent end portions of two cars equipped with my improved coupling devices 3 and 4. These coupling devices are similar in construction, so that a description of one will suffice for both.

Extending longitudinally upon the underside of the supporting portion of the car and suitably secured thereto is a bracket 5, the rear end of which is bent to form a supporting portion 6 for a bolt 7 carrying at its lower end a guide ring or yoke 8. The coupling proper comprises a head 9 provided with a rearwardly extending shank or stem 10 projecting at its rear end through the yoke 8 in which it is slidably mounted to permit the coupling to move in a direction longitudinally of the car. A coiled cushioning spring 11 surrounds the shank between the head 9 and yoke to normally maintain the coupling head in a predetermined position and to cushion the impact when another coupler comes in contact therewith. A key 11$^a$, passing through the rear end of shank 10, abuts against yoke 8 to limit the forward movement of the coupler and prevent the shank from being pulled out of the yoke in uncoupling.

The head 9 is provided with an air passage or duct 12 opening at its rear end through one side thereof and at its forward end through the abutting face of the head, the said rear end of the duct being in communication with a hose pipe 13 suitably attached to the head and adapted to connect the same with the proximate end of the train pipe. The abutting face of the coupling head extends laterally in the form of a compound curve, so that the convex portion of the face of one coupler head will fit into the concave face of the head of the opposing coupler, and vice versa, the form of the concave face being such as to provide upon each coupling head guide surfaces, whereby the abutting faces of the heads of opposing couplers may ride easy into contact with one another.

It should be stated that the coupling heads are arranged in "rights" and "lefts" upon the opposite ends of each car, the arrangement being such that the convex portion of the coupling head at one end of the car will be on one side and the concave face on the other side of the longitudinal center of the head, and the parts of the abutting face of the other coupler relatively reversely arranged so that the couplers upon opposing cars will come together with their concave and their convex faces interfitting, as clearly illustrated in the drawing. The convex face of each coupling head is provided with a tongue or projection 14 adapted to engage a receiving groove 15 in the concaved face of the opposing coupler, as illustrated in Fig. 2, the arrangement being such that the tongues and grooves of two connected couplers will seal the joint between the abutting faces and prevent to a large extent the escape of air flowing through the ducts 12. Each coupling head may be provided with a single duct or a plurality of ducts, to adapt the same for use upon freight or passenger cars, as circumstances may require.

Each coupling head is provided with a curved boss or shoulder 16 formed upon the outer side of the extended portion constituting the convex portion of the abutting face, and carries at its opposite side a locking spring 17 bent at its free end to form a clasp 18 to engage the corresponding shoulder on the opposing coupler, the clasp being arranged to project on the side on which the concaved portion of the abutting face is formed.

By the arrangement of the couplers in "rights" and "lefts" it will be understood that the shoulder and coupling spring of one coupling head will be respectively disposed at top and bottom thereof, while the corresponding parts of the other coupling head will be reversely arranged, so that the parts will unite in the manner shown.

The forward portion of the bracket 5 is bent downward to form an arm 19 supporting chains or other flexible connections 20 which are attached at their lower free ends to the sides of the coupling head 9 and support the same in position, while permitting said head to have vertical and lateral play to adapt it to swing freely to accommodate itself to vertical and lateral play of the cars in running and rounding curves.

It will be understood that in operation, when two cars come together the abutting faces of the two coupling heads thereon will ride in contact and mutually adjust themselves to duct closing position, and the locking springs will slide over and snap into engagement with the shoulders, thus locking the couplings together securely enough to effect an air tight connection between them. In the separation of the cars, when the ordinary car couplings are disconnected, a sliht movement of one car away from the other will withdraw the shoulders from engagement with the springs, thus permittting the coupling heads to separate.

Having thus described the invention, what is claimed as new, is:—

1. In an automatic air brake coupling, a bracket secured to the car, a coupling head having a shank, a guide depending from the bracket and slidably supporting the shank, a cushioning spring about the shank between the coupling head and guide, and a flexible connection depending from the bracket and movably supporting the coupling head.

2. In an automatic air brake coupling, a bracket secured to the underside of a car, a yoke supported by the rear end of the bracket, a coupling head having a shank slidably supported by the yoke, a cushioning spring about the shank between the coupling head and guide, and a flexible connection between the forward end of the bracket and the coupling head, whereby the latter is movably supported.

3. In an automatic air brake coupling, a coupler head provided with an air passage and having a compoundly curved abutting face, the convex portion of the curve being provided with a tongue and the concave portion with a recess.

4. In an automatic air brake coupling, the combination of a bracket having its front and rear ends bent downwardly to form supporting portions, a bolt connected with the rear supporting portion and carrying a yoke, a coupler head having a shank slidably supported by the yoke, a cushioning spring about the shank between the coupler head and yoke, and a flexible connection between the coupler head and front supporting portion of the bracket.

5. In an automatic air brake coupling, a coupler head provided with an air passage and having a compoundly curved abutting face, one portion of the curve being provided with a tongue and the other with a recess.

In testimony whereof, I affix my signature in presence of two witnesses.

THOMAS B. McMILLAN.

Witnesses:
C. HOCKER,
J. N. BLAND.